United States Patent Office 3,505,273
Patented Apr. 7, 1970

3,505,273
METHOD FOR REDUCING THE SOLVENT CONTENT OF A POLYCARBONATE
Thomas H. Cleveland, New Martinsville, W. Va., and Emanuel W. Wirfel, McKees Rocks, Pa., assignors to Mobay Chemical Company, Pittsburgh, Pa., a corporation of Delaware
No Drawing. Continuation-in-part of application Ser. No. 329,897, Dec. 11, 1963. This application May 4, 1967, Ser. No. 636,002
Int. Cl. C08g $17/13$, $53/00$
U.S. Cl. 260—33.8   7 Claims

ABSTRACT OF THE DISCLOSURE

Reducing the solvent content of a polycarbonate solution by mixing a polycarbonate dissolved in a solvent having a boiling point of less than about 100° C., the major portion of which is immiscible with water, with water heated to a temperature above the boiling point of the solvent, at a rate whereby the solvent is slowly volatilized from the polycarbonate solution and a friable dough is obtained which contains from about 25 to about 70 percent solvent.

---

This invention relates to polycarbonates and more specifically to a novel process for the recovery of polycarbonates from a solution thereof, and is a continuation-in-part of copending application Ser. No. 329,897, filed Dec. 11, 1963, now abandoned.

There have been various methods used for the preparation of polycarbonates, some of which have been described in U.S. Patents 3,028,365; 3,043,800; and 3,043,-802 and in Canadian Patents 578,795; 594,805; and 611,970. Probably the most commercially-used process for the preparation of polycarbonates involves the phosgenation of 2,2-bis-(4-hydroxy phenyl)-propane (Bisphenol A) as is described in detail in the above-noted Patent 3,028,365. The polycarbonate product obtained in the processes described in the above-noted patents is usually in the form of a solution. However, it is expedient for economic reasons that the polycarbonate be in a solid rather than a liquid form such as, for example, in molding operations which require that the polycarbonate be in a powder or pellet form rather than in solution. Further, since even the best organic solvents will not normally dissolve more than about 30 parts of polycarbonate per 100 parts of solvent at ambient temperature and pressure, the transportation expense of shipping a polycarbonate in its solution form will be extremely high because of the weight of the solvent present. An additional reason for recovering the polycarbonate solid from its solution form is the volatile nature of polycarbonate solvents which require precaution in the handling and further processing of polycarbonate solutions. It is therefore not only desirable but almost a requirement that the solvent be removed from polycarbonate solutions so that they may be further handled as solid materials.

Various attempts have been made to provide a process for removing solvents from polycarbonate solutions which is economical but which will permit the achievement of high product quality. Most of the suggested processes, however, leave much to be desired. For example, some of the suggested methods involve extruding the polycarbonate solution, thereby removing moisture and volatiles by volatilization. Other suggested methods include heating the polycarbonate solution to evaporate substantially all of the solvent therefrom and/or precipitation procedures which usually involve the addition of a suitable non-solvent directly to the polycarbonate solution to form a precipitate when is then filtered from the solution.

It is also known that polycarbonates may be removed from solutions thereof by spraying or otherwise throwing together streams of boiling water and polycarbonate solution while mixing the resulting combination at a great speed (recommended to be about 1725 revolutions per minute). The solvent is thus substantially completely removed at an exceedingly rapid rate. The particles obtained can contain from about 90 to about 98% by weight of water and after drying have an extremely low bulk density of from about 2 to about 6 lbs./ft.³. However, such polycarbonate particles are practically without commercial value due to their extremely low bulk density. It is, therefore, required that the polycarbonate material thus produced be further compacted or ground to a somewhat higher bulk density in which case the non-uniformity and very large size of the resulting particles makes them more difficult to employ in further processing or grinding operations. As a consequence, such a recovery method is commercially unfeasible.

It is, therefore, an object of this invention to provide a method for the recovery of polycarbonates from a solution thereof which is devoid of the foregoing disadvantages.

Another object of this invention is to provide a process for the production of substantially solvent free polycarbonate materials having relatively high bulk densities.

A further object of this invention is to provide a simple, direct, and economical process for the preparation of a polycarbonate in a commercially useful physical form.

An additional object of this invention is to provide a continous process for the production of polycarbonates wherein the polycarbonate recovered therefrom is capable of being further handled, processed, and transported in an easy and economical manner.

The foregoing objects and others which will become apparent from the following description are accomplished in accordance with this invention, generally speaking, by a process for the recovery of polycarbonate from a solution thereof which comprises mixing polycarbonate solution with a predetermined amount of hot water sufficient to evaporate solvent from said solution and form a resulting solid, friable, or frangible polycarbonate mass. The heat input supplied during the mixing via the hot water is controlled so that only that amount of solvent is volatilized which is sufficient to convert the liquid polycarbonate solution into a substantially solid friable mass. The solvent used in the liquid polycarbonate solution must have a boiling point substantially lower than that of the hot water, or about 100° C. at atmospheric pressure and it is preferred as a consequence that the solvent contain as a major portion thereof either methylene chloride or ethylene dichloride. It is possible, however, that minor portions (not to exceed about 10% of the solvent) may be a higher boiling solvent, provided the solvent mixture containing the higher and lower boiling solvents has a boiling point lower than about 100° C. Some of the higher boiling solvents which may be used in a minor amount in the solvent mixture are, for example, monochlorobenzene and o-dichlorobenzene. The friable mass obtained after volatilization of the solvent must contain substantial amounts of solvent, the concentration of the solvent being in the range of from about 25% to about 70% by weight based on the total weight of the friable mass. It is important and indeed critical in the practice of the present invention that the substantially solid product produced after evaporation or volatilization be a dough or paste-like material which will easily break up into a free flowing particulate product.

The major portion of the solvent or solvent mix in the liquid polycarbonate solution must be immiscible with water and under normal conditions as above-mentioned have a boiling point substantially below about 100° C. The initial polycarbonate solution may vary in concentration from about 1 to 40% under normal conditions of pressure and temperature, although it is possible to increase the concentration of the polycarbonate solution by varying these conditions. In a preferred embodiment of this invention, methylene chloride is used as the solvent for a polycarbonate solution having a concentration of from about 7% to about 25% polycarbonate. The instant process is adaptable to batch, semi-continuous and continuous processes as long as the evaporation of the above-defined solvents can be sufficiently controlled to yield a friable dough.

The amounts of water and polycarbonate solution to be mixed may easily be determined once the percentage of solvent to be retained in the friable mass product desired is known. If desired, the water may be added in more than one step to reduce the solvent content in the solution. The temperature of the water may be controlled by exterior heat such as, for example, from heating jackets or coils, or by the addition of steam. In addition, the hot water in the system may be recycled, reheated, or both recycled and reheated as desired. By controlling the heat of the water together with the amount of water used in the operation, the amount of heat input via the water is controlled in such a manner that only a desired amount of solvent is volatilized from the liquid polycarbonate solution. By controlling the evaporation or volatilization in this manner a friable dough or mass results which upon further treatment yields a polycarbonate having a comparatively high bulk density. It is important to the present invention that mechanical agitation or mixing be provided, and mixers such as, for example, a "Kneadermaster," a continuous sigma blade mixer, anchor type agitators, batch sigma mixers (e.g., Baker Perkins), pug mills and the like may be used.

In a batch process the amount of water at a given heat is readily determinable; in a continuous process the quantity to be used would be expressed as a rate per unit of time. For example, to obtain a granular polycarbonate powder in a continuous system from a friable mass containing about 30% residual solvent, which friable mass is obtained from a 10% solution of the polycarbonate in methylene chloride, the following method can be used. The rate of hot water addition at 95° C. required to be mixed with the 10% solution at 20° C. and at a feed rate of 2 lbs./min. is calculated as follows:

The fixed process conditions are:

Feed rate of 10% polycarbonate solution—2 lbs./min.
Specific heat of water—1 B.t.u./lb./° F.
Specific heat of polycarbonate solution—0.3 B.t.u./lb./° F.
Water temperature—95° C. (203° F.)
Polycarbonate solution temperature—20° C. (68° F.)
Boiling point of methylene chloride—40° C. (104° F.)
Latent heat of vaporization of methylene chloride—141.7 B.t.u./lb.
Desired final polycarbonate composition:
  Percent solids—70
  Percent methylene chloride (solvent)—30
Then:
(1) at a feed rate of 2 lbs./min. of a 10% solution of polycarbonate in methylene chloride, the feed per minute will contain 0.2 lb. of polycarbonate and 1.8 lbs. of methylene chloride. Therefore, to reach a state where the solids concentration is 70% (30% residual solvent) the final composition will be 0.2 lb. of polycarbonate and 0.0857 lb. of methylene chloride. Thus, 1.8 minus 0.0857, or 1.714 lbs./min., of methylene chloride must be evaporated.

(2) the total heat required to evaporate 1.714 lbs. of methylene chloride/min. at 40° C. equals $1.714 \times 141.7$ B.t.u./lb. or 243 B.t.u. In addition, the polycarbonate solution must be brought to the boiling point of methylene chloride (40° C.) so that additional heat required to do this is equal to 2 lbs. $\times$ (0.3 B.t.u./lb./° F.) $\times$ (36° F.) or 22 B.t.u. Therefore, total heat required to both raise the temperature of the solution from 20° to 40° C. and evaporate 1.714 lbs./min. of methylene chloride is equal to 243 plus 22 or 265 B.t.u.

(3) in addition it was determined experimentally that conduction and radiation heat losses associated with the particular equipment used and at the temperatures and feed rates employed was in the order of 200 B.t.u./min.

(4) then the adjusted total heat required to accomplish the desired goal evaporation of the required amount of methylene chloride while compensating for heat losses was equal to 265 B.t.u. plus 200 B.t.u. or 465 B.t.u./min.

(5) therefore, the total amount of hot water at 95° C. (203° F.) required to accomplish the desired goal would be that amount needed to furnish 465 B.t.u./min. allowing for a water discharge temperature of 40° C. (104° F.) or $N$=lbs./min. water required, and since heat loss must equal to heat gained:

$N(\Delta T) \times$ specific heat of water=465 B.t.u./min.

$$\therefore N = \frac{465 \text{ B.t.u./min.}}{1 \text{ B.t.u./lb./°F.} \times (203 - 104°F.)}$$

or $N$=4.7 lbs. of water per minute.

Heat balance calculations similar to the one given above can be used to determine any other feed rates, given the desired final solids concentration.

Polycarbonates prepared by the process of this invention are eminently suitable for further processing according to any production methods desired such as, for example, extrusion, injection molding, casting and the like. They may be used to prepare any of those products for which polycarbonates have been found to have utility such as, for example, in the preparation and production of sporting goods including skis, golf balls and the like, in the production of housings for appliances such as hair dryers and the like and so on.

The invention is further illustrated but is not intented to be limited by the following examples in which all parts and percentages are by weight unless otherwise specified.

EXAMPLE 1

A polycarbonate solution prepared from 4, 4'-dihydroxydiphenyl propane (Bisphenol A), as described in U.S. Patent 3,028,365 is fed to a Patterson Foundry and Machine Company "Kneadermaster" continuous mixer. To obtain a friable dough having about 70% solids, about a 10% polycarbonate solution is fed to the mixer at a rate of about 2 lbs./min. while water is maintained at a temperature of about 95° C. and is fed to the mixer at a rate of about 2.67 lbs./min. The polycarbonate solution and the hot water are slowly mixed and the methylene chloride solvent is volatilized from the polycarbonate solution until a dough is formed which breaks up in the mixer before it is discharged. The material discharged from the mixer is in the form of small balls of dough which can be broken up by hand very easily. The bulk density of this material is analyzed to be about 31 lbs./cu. ft. after final drying.

EXAMPLES 2 to 13

The general procedure described in Example 1 is followed except for the variations indicated in the table below:

| Solvent | Concentration of polymer solution fed to mixer, percent solids | Feed rate of polymer soln. to mixer, lbs./min. | Feed rate of 80° C. water, lbs./min. | Feed rate of 90° C. water, lbs./min. | Concentration of solids discharged, percent solids | Time for "dough" to break up into powder, minutes |
|---|---|---|---|---|---|---|
| Methylene chloride | 10 | 5.6 | 9.66 | 7.72 | 50 | 7 |
| | 10 | 5.6 | 10.03 | 8.02 | 60 | 4 |
| | 10 | 5.6 | 10.29 | 8.23 | 70 | <3 |
| | 20 | 3.0 | 3.99 | 3.19 | 50 | 7 |
| | 20 | 3.0 | 4.39 | 3.51 | 60 | 4 |
| | 20 | 3.0 | 4.66 | 3.73 | 70 | <3 |
| | | | (95° C. Water) | | | |
| Ethylene dichloride | 10 | 5.6 | 40.21 | | 50 | 20 |
| | 10 | 5.6 | 41.91 | | 60 | 9 |
| | 10 | 5.6 | 42.40 | | 70 | 3 |
| | 20 | 3.0 | 17.43 | | 50 | 20 |
| | 20 | 3.0 | 18.8 | | 60 | 9 |
| | 20 | 3.0 | 19.76 | | 70 | 3 |

The amount of water shown in this table is enough to yield a dough of the given concentration, but does not take into account any heat losses which require an additional amount of water. These heat losses can be determined experimentally or calculated by known methods.

EXAMPLE 14

A polycarbonate solution prepared as an Example 1 but having the composition of about 10% polycarbonate, about 10% monochlorobenzene and about 80% methylene chloride, is fed at the rate of about 100 lbs./hr. and at about 25° C. to a "Kneadermaster" unit. Water at about 95° C. is fed to this same unit at a rate of about 950 lbs./hr. (these amounts include about 25% extra heat to compensate for heat losses through the equipment walls). The ingredients are slowly and continuously mixed as they proceed forward in the mixer while most of the methylene chloride and some of the monochlorobenzene is vaporized. A frangible dough is formed which breaks up near the discharge end of the mixer. The discharged dough has a composition of about 70% polycarbonate, 23.4% monochlorobenzene, and 6.6% methylene chloride. This dough can be ground easily and brought to a solvent-free status by various means, for example, fluidized bed drying. The bulk density of the product is between about 28–32 lbs./cu. ft.

EXAMPLE 15

A solution of polycarbonate is prepared as described in Example 1. About 500 lbs. of this solution containing about 20% of polycarbonate and about 80% of methylene chloride are added to a batch-type sigma mixer. The temperature of the solution is about 25° C. To this mixture is added over a period of 20 to 30 minutes while agitating slowly about 1165 lbs. of water at a temperature of about 95° C. (includes 25% extra heat to compensate for heat losses through the equipment walls). During this period a substantial amount of the methylene chloride present vaporizes and the solution changes to a friable dough which breaks up into discrete particles near the end of the cycle. The free flowing particles obtained are dumped out by tilting the mixer, and are easily ground to a small particle size. The small particles are then further processed to a dry state by any suitable means such as, for example, by boiling them in water for several hours to remove substantially all of the solvent and subsequently drying them. The dry product has a bulk density of from about 28–33 lbs./cu. ft.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. A method for reducing the solvent content of a polycarbonate solution which comprises mixing a polycarbonate solution with heated water at a rate whereby the solvent is slowly volatilized from the polycarbonate solution to form a friable dough containing from about 25 to about 70 percent of solvent having a boiling point of less than about 100° C. at atmospheric pressure, the major portion of the solvent being immiscible with water and the heated water being at a temperature above the boiling point of the solvent.

2. The method of claim 1 wherein the solvent is methylene chloride or ethylene dichloride.

3. The method of claim 1 wherein the solvent contains at least about 90 percent of methylene chloride or ethylene dichloride.

4. The method of claim 1 wherein the solvent is a mixture containing up to about 10% of a solvent having a boiling point above about 100° C., the boiling point of the mixture being less than about 100° C.

5. The method of claim 1 wherein the polycarbonate solution being treated is from about a 7% to about a 25% solution of polycarbonate in methylene chloride.

6. The method of claim 1 wherein the mixing is carried out by means of mechanical agitation.

7. The method of claim 1 wherein the polycarbonate solution is prepared from 4,4'-dihydroxydiphenyl propane.

References Cited

UNITED STATES PATENTS

| 2,989,503 | 6/1961 | Jibben | 260—47 |
| 3,112,292 | 11/1963 | Bottenbruch et al. | 260—47 |
| 3,267,074 | 8/1966 | Wood | 260—47 |

SAMUEL H. BLECH, Primary Examiner

U.S. Cl. X.R.

260—34.2, 47, 96